M. B. LLOYD.
COLLAPSIBLE GO-CART.
APPLICATION FILED NOV. 14, 1910.
1,122,516.
Patented Dec. 29, 1914.
2 SHEETS—SHEET 1.
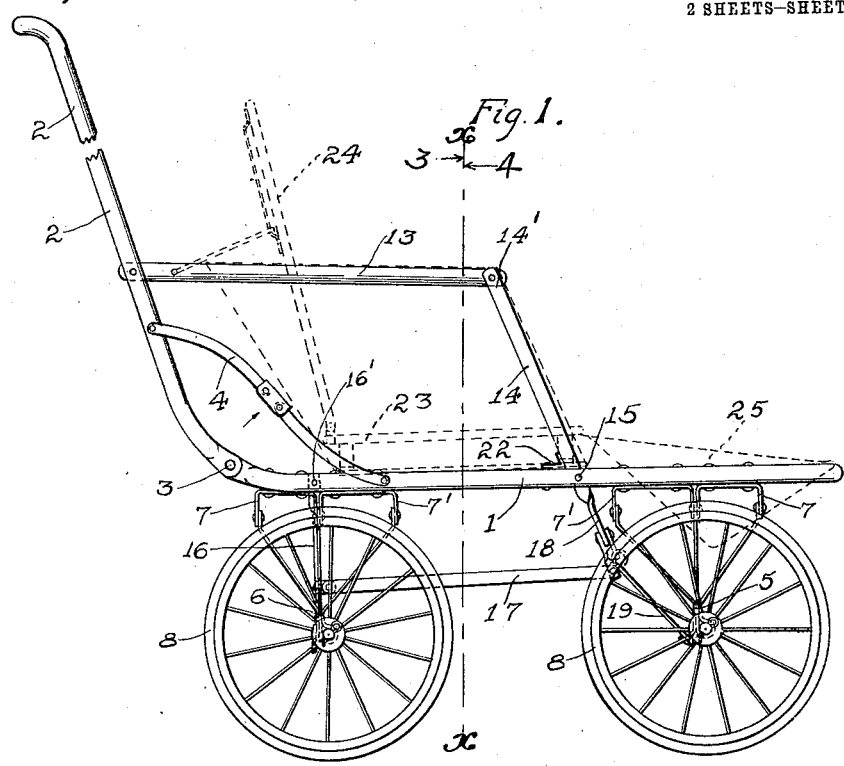
Fig. 1.
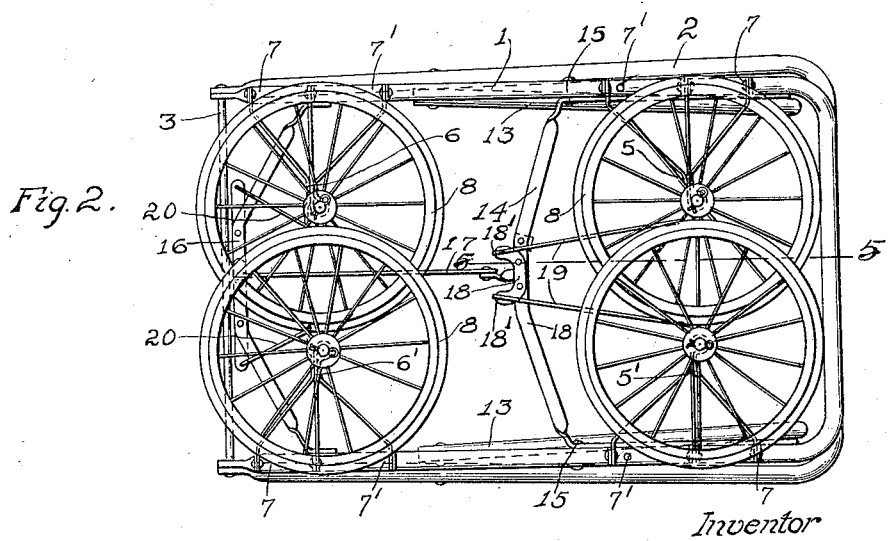
Fig. 2.
Witnesses
Robert S. McCreadie
Edward F. Wilson
Inventor
Marshall B Lloyd
by 
Attorney M. B. LLOYD.
COLLAPSIBLE GO-CART.
APPLICATION FILED NOV. 14, 1910.
1,122,516.
Patented Dec. 29, 1914.
2 SHEETS—SHEET 2.
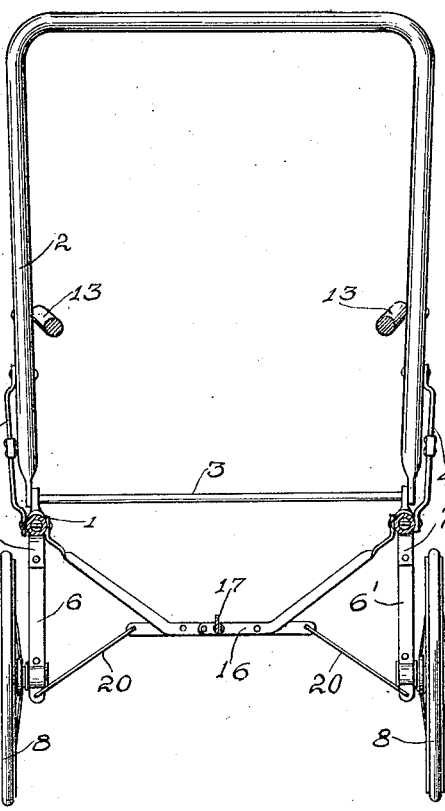
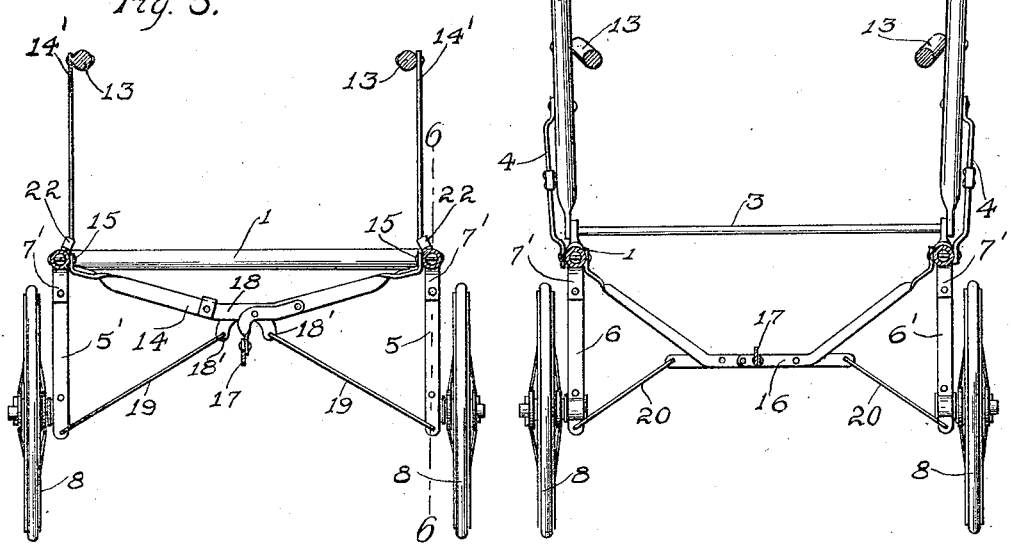
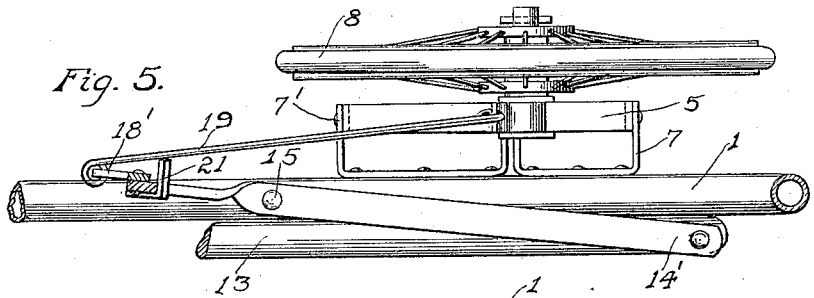
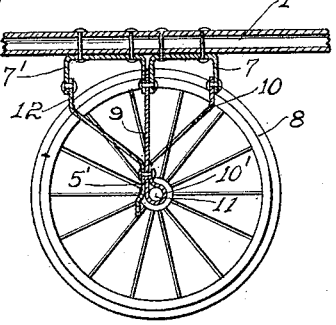
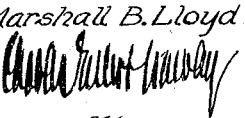
Witnesses
Robert S. McCreadie
Edward F. Wilson
Inventor
Marshall B. Lloyd
by
Attorney

UNITED STATES PATENT OFFICE.

MARSHALL B. LLOYD, OF MENOMINEE, MICHIGAN, ASSIGNOR TO FERRIS & LEITH, OF CHICAGO, ILLINOIS, A FIRM COMPOSED OF WILLIAM S. FERRIS, TRUSTEE, OF ELKHART, INDIANA, AND ALEXANDER B. LEITH, TRUSTEE, OF CHICAGO, ILLINOIS.

COLLAPSIBLE GO-CART.

1,122,516.     Specification of Letters Patent.     Patented Dec. 29, 1914.

Application filed November 14, 1910. Serial No. 592,274.

*To all whom it may concern:*

Be it known that I, MARSHALL B. LLOYD, a citizen of the United States, and resident of Menominee, county of Menominee, and State of Michigan, have invented certain new and useful Improvements in Collapsible Go-Carts, of which the following is a full, true, clear, and exact description, such as will enable others skilled in the art to make and use the same.

My invention relates to improvements in baby-carriages or go-carts, and has particular reference to go-carts of the class characterized by a main frame, a handle member and wheel frames pivotally joined together and relatively movable to a parallel relation, to collapse or fold the cart.

The object of my invention is to simplify the construction, reduce the weight and lessen the manufacturing cost of carts of this class without sacrificing any of the essential or desirable features thereof.

A further object is to provide wheel mountings for carts of this class which shall permit the independent, *i. e.*, the non-simultaneous folding or collapsing of the wheeled frames and their wheels upon or beneath the main frame.

My invention consists of a go-cart of the above specified class, provided with four separate and independent wheeled sub-frames or brackets separately and independently foldable beneath the main frame, and mechanism associated therewith and with the main frame and handle member for causing the four sub-frames to swing inwardly beneath the main frame to substantially parallel positions in different time relations, as the handle member and frame are closed together and vice versa.

Further, my invention consists in a go-cart of the class described provided with two independent pairs of wheels one at the forward end and one at the rear end of the cart, the four wheels being mounted upon independent sub-brackets pivotally connected with the main frame, and a system of levers and links connecting the brackets with the handle member and main frame and adapted to fold the two wheels of each pair, one in advance of the other, to overlapped position beneath the main frame, also to fold the rear wheels in advance of the front wheels.

Another feature of my invention resides in individually wheeled sub-frames of unique construction pivotally connected to the main frame for folding therebeneath and adapted to maintain the wheels in running position strongly braced against the severe shocks to which they are subjected in use.

A further feature relates to means for preventing the forward wheeled frames from being moved inwardly to a locked position when folded beneath the main frame.

A further feature resides in stops carried by the main frame arranged to limit to outward movement of the various collapsible members of the cart, and conveniently positioned locking means joining the handle member and the main frame, said stops and locking means being so related that when the cart is opened for use it can be locked rigidly in its extended or open position.

My invention also consists in various novel features of construction and combinations of parts, all as hereinafter fully described and particularly pointed out in the claims.

My invention will be more readily understood by reference to the accompanying drawings forming a part of this specification and in which:

Figure 1 is a side elevation of a collapsible go-cart embodying my invention, having the seat, the seat back and the foot pocket indicated in dotted lines; Fig. 2 is a bottom plan view of the go-cart in its collapsed position; Fig. 3 is a vertical section of the cart taken on line X—X of Fig. 1 viewed in the direction of the arrow 3; Fig. 4 is a section similar to Fig. 3 taken on the line X—X of Fig. 1 viewed in the direction of the arrow 4; Fig. 5 is an enlarged fragmentary section taken on the line 5—5 of Fig. 2; and Fig. 6 is a vertical section of one of the wheeled frames and a portion of the main frame on the line 6—6 of Fig. 3.

In the form of my invention illustrated in the drawings 1 is a main frame which carries the various members of the cart and is preferably formed of light tubing bent into a U-shape and having its ends turned slightly upward and flattened to receive the lower ends of the handle member 2. This handle member also comprises a U-shaped frame preferably made of light metal tubing and having its lower ends formed similar to the free ends of the main frame, i. e. slightly curved and flattened. These two frames are pivotally connected at their free flattened ends by means of a light cross bar 3 and are adapted to be moved into substantially parallel relation to each other to collapse or fold the cart, the curved ends of these frames permitting them to be closed to parallel relation without interfering with each other. As clearly illustrated in Fig. 1, these two frames are maintained in their extended relation by means of locking toggle levers 4 arranged at each side of the cart and pivotally connected to each of said frames adjacent to their free or pivoted ends. When it is desired to swing the handle member 2 forward on its pivots to a parallel relation with the main frame, the toggle levers are "broken" in the direction of the arrow on Fig. 1 and are folded in an obvious manner with the folding of the two main members.

In operating or closing carts of this character, especially on carpets or rough surfaces, the fact that the lower portions of the wheels move toward each other militates against an easy operation, in other words, when the handle member is pushed forward to close it down upon the cart the weight of the cart and the pressure applied to the handle member to cause the cart to collapse causes friction between the wheels and the surface upon which they rest, and they are thus prevented from moving easily to their inwardly collapsed position. To overcome this difficulty, as hereinafter explained, I provide means whereby one of the pairs of wheels, preferably the rear pair, will be folded in advance of the other or front pair, and in closing the cart I tilt the cart, resting its weight first upon the forward pair of wheels until the rear wheels are partly folded or brought to such an angular position that they will not be prevented from closing easily to their completely folded position, then I tilt the cart backward, supporting its weight upon the partly folded rear wheels and lifting the front wheels free from the floor. In this manner I am enabled to quickly and easily fold or collapse the cart without unduly straining any part thereof, and a further advantage results in that I am enabled to make the various parts of the cart which operate the wheeled frames lighter than I otherwise could. To make this operation of the wheels possible and convenient I provide the cart with four separate and independent wheeled sub-frames or brackets, 5, 5', and 6, 6', of peculiar construction arranged beneath the forward and rear ends respectively of the main frame 1. These wheeled frames are pivotally mounted beneath the main frame and are connected to and associated with the handle member 2 in such manner that when the handle member is moved forward to close it upon the main frame, the wheeled frames are swung inwardly on their pivots from a vertical position beneath the main frame to a substantially horizontal parallel relation thereto and vice versa. These frames 5, 5' and 6, 6', are pivotally mounted upon brackets 7 and 7', which are carried by the main frame and which extend downwardly therefrom. The brackets 7 and 7' are each formed of light rectangular bars bent into U-shape, their middle portions being riveted to the main frame and their ends extending downward therefrom a sufficient distance to permit the wheels to be brought into a substantially parallel relation to the main frame when folded therebeneath without interfering with the various other structures of the cart. The brackets 7 and 7' are positioned close together, their adjacent ends, together, forming one point of connection and their oppositely disposed ends forming two additional points of connection widely separated longitudinally, of the main frame, and forming with their connected wheel frames a very light and rigid support for the wheels 8. The wheeled frames 5, 5' and 6, 6', are each pivotally connected with the main frame by three longitudinally alined pivots and are each made up of three legs or members rigidly connected together at their lower ends and spread apart toward the frame forming a very strong and light construction. Two of said leg members 9 and 10 are bent up or formed out of one strip or bar of metal, the free ends of which are pivotally connected to the brackets 7, 7' and the middle portion of which is formed into an eye 10' to receive the inner end of the wheel trunnion 11, which is tightly clamped therein. The third leg 12 of the wheel frame is riveted to the other member thereof close to the eye 10' and has its lower end extended below the eye and perforated to receive a wire operating link which will be described hereinafter. The cart is also provided with substantially horizontally disposed arm-bars 13, the rear ends of which are pivotally connected with the handle member 2 at suitable height and the forward ends of which are pivotally connected to the upper or free ends 14' of a U-shaped cross bar 14. This cross bar is pivotally mounted on the side bars of the main frame at 15 and its middle portion extends below said frame, the bar as a whole forming a lever adapted to be operated by the movement of the handle member 2, through the arm-bars 13, from a rearwardly inclined position as shown in Fig. 1 to a substantially parallel relation to the main frame as the handle member is moved forward to collapse the cart. A second U-shaped cross bar 16 is pivotally mounted similar to the cross bar 14 and is arranged substantially between the rear wheels and is connected at its middle portion with the middle portion of the forward cross bar 14 by means of a longitudinal link 17. The lower portion 18 of the cross bar 14 is swung rearwardly as the handle member 2 is closed upon the main frame and the link 17 swings the rear cross bar 16 in similar manner. Wire links 19 pivotally connect the middle portion 18 of the cross bar 14 with respective wheel frames 5, 5', at each side of the cart, the cross bar being provided with downward projections 18' having openings adapted to receive the inner ends of the links 19. These links are preferably formed of wire and are bent into eyes at their ends, thereby providing a simple form of universal joint for connection with the cross bar and the wheel frames. As the cart is collapsed and the lower portion 18 of the cross bar 14 is swung rearwardly, the links 19 draw the lower ends of the wheel frames 5, 5' inwardly beneath the main frame. Similar links 20 are provided connecting the rear cross bar 16 with the rear wheel frames, 6, 6' and operate in similar manner to swing the wheel frames, and wheels beneath the main frame. The outer ends of the links 19 and 20 are connected to the downward extensions of the leg members 12 below the wheel trunnions.

To cause the rear wheels to be folded or collapsed in advance of the front wheels, I so position or relate the cross bars, and the links connecting them with the respective wheel brackets, that the rear brackets are moved more quickly at the beginning of the closing operation than at the end thereof while the front brackets are caused to lag at the beginning and move more quickly toward the last of the closing operation. To cause the front brackets to lag at the beginning of the closing operation I position the cross bar 14 somewhat to the rear of the centers of the forward wheels and incline the lower portion thereof forwardly, connecting the cross bar, as stated before, to the brackets 5, 5' by means of the comparatively long links 19. When the cross bar 14 begins to swing rearwardly on its pivots 15 from its open or extended position, the pivotal connections between the bar and the links 19 moves slightly downward as well as rearward, thus maintaining the effective distance between the pivotal connections of the cross bar 14 and the brackets 5, 5' substantially unchanged during the first portion of this movement, this results in holding the brackets and their wheels stationary or in moving them very slowly inwardly. During the latter part of the movement however the lower portion 18 of the cross bar 14 is moving rearwardly directly away from the brackets and the rear ends of the links 19 are thus moving longitudinally of the frame and to compensate for this movement the front brackets are swung or collapsed at a quicker rate. On the other hand, to give the rear brackets their quicker movement at the beginning and slower movement toward the last of the collapsing operation, I arranged the cross bar 16 in vertical position instead of on an angle, and substantially centrally between the rear wheels. This bar is pivoted to the frame at 16' directly above the wheels and consequently the links 20 are comparatively short and lie substantially in the plane of the cross bar, and therefore when the bar begins to swing in its pivots the first portion of its movement swings the inner ends of the links 20 rearwardly or directly away from the position of their outer ends and this moves or swings the brackets 6, 6' inwardly at a rapid rate. Toward the last end of the movement of the cross bar 16, however, it is moving upwardly toward the main frame and as the wheel frames now have been swung in, to substantially horizontal position the outer ends of the links have been carried upwardly approximately into alinement with the pivots 16' and hence any movement of the bar 16 does not at this time affect the position of the wheel brackets materially.

As clearly illustrated in Fig. 5 a projection 21 is provided which is rigidly mounted on the lower portion 18 of the forward cross bar 14 in the path of one of said wire links 19 and is adapted to prevent the wheel frame 5, to which it is connected, from being folded so close to the main frame that when the handle is operated to unfold or open the cart, the angular relation between the cross bar 14 and the link 19 will be insufficient to cause the wheel frame to move outwardly. In other words without this stop the wheel frames can swing in so close to the main frame that they are, in a practical sense, locked, in their relative positions and the first action of the cross bar 14, as the handle member is swung to open the cart, is to force the wheel frame inwardly instead of outwardly. The stop 21 is arranged in the path of the link 19, operating the wheel frame 5 which is arranged to fold in advance of the wheel frame 5'. The opposite wheel thus folds down or rests upon the first wheel and is also prevented from folding into too close relation to the main frame.

To maintain the cart rigidly in extended or open position knees or limit stops 22 are rigidly mounted upon the main frame 1 against which the upper ends 14' of the cross bar 14 are adapted to be drawn or pressed as the handle 2 reaches its extreme outward or open position. The upper or free ends of the cross bar 14 spring sufficiently to permit the locking of the toggle levers 4 and when these levers are locked the strain in the structure is sufficient to keep all the members rigidly in their proper relative positions. As indicated in dotted lines in Fig. 1, a seat 23, a seat back 24 and a foot pocket 25 are provided and are suitably connected and mounted upon the cart structure.

In collapsing go-carts in which the forward and rear pairs of wheels are collapsed simultaneously, it is usually necessary to raise the cart free of the floor especially if the operation occurs upon a rough or carpeted surface, in order to permit the wheels to move freely inwardly, and consequently both hands are required to perform the collapsing operation. In collapsing the herein described cart, however, the operation can readily be accomplished with but one hand, as the rear wheels can be raised clear of the floor by the handle, the weight of the cart meanwhile resting upon the front wheels, and when the rear wheels are partly collapsed, the cart can be lowered upon them and the front wheels raised clear of the floor and the collapsing operation completed.

As various modifications of the invention will readily suggest themselves to one skilled in the art, I do not limit or confine the invention to the exact structure as illustrated and described.

Having thus described my invention, I claim as new and desire to secure by Letters Patent:

1. In a collapsible go-cart a main frame and a handle member pivotally connected and adapted to be moved into parallel relation to collapse the cart, in combination with four separate and independent wheeled sub-frames two at each side, pivotally mounted beneath the main frame, and independently movable from a right-angled relation to a substantially parallel relation thereto, and mechanism connecting the sub-frames with the main frame and handle member and adapted to automatically swing the four sub-frames beneath the main frame in different time relations as the handle member and main frame are moved into parallel relation.

2. In a collapsible go-cart a main frame and a handle member pivotally connected and adapted to be moved into parallel relation to collapse the cart, in combination with four separate and independent wheeled sub-frames pivotally mounted beneath the main frame and separably and independently movable from a right-angled relation thereto to a substantially parallel relation therewith, and mechanism connecting said four sub-frames with the handle member, adapted to fold said sub-frames automatically beneath the main frame in different time relations when the handle member and main frame are moved into parallel relation.

3. In a collapsible go-cart a main frame and a handle member pivotally connected and adapted to be moved into parallel relation to collapse the cart, in combination with two pairs of independent wheeled sub-frames one in front of the other, pivotally mounted beneath the main frame, and movable from a right-angled relation to a substantially parallel overlapped relation beneath the main frame and mechanism connecting said sub-frames with the main frame and handle member, and adapted to cause one sub-frame of each pair to be moved in advance of the other thereof.

4. In a collapsible go-cart the combination with a main frame and a handle member pivotally mounted thereon and movable from an extended position to a parallel relation thereto to collapse the cart, of a crossbar having upward extending side members pivotally connected between their ends to the main frame adjacent to its forward end, links arranged substantially parallel to the main frame connecting the upper ends of said side members with the handle member and adapted to move said cross-bar rearwardly when the handle member is closed upon the main frame, a second cross-bar having upward extending ends pivotally connected to the main frame adjacent to its rear end, a link connecting the middle portions of said cross-bars causing them to move in unison, two pairs of foldable wheeled sub-brackets pivotally mounted, one at the forward end and one at the rear end of the main frame, and links connecting the lower ends of said sub-brackets with the middle portions of the adjacent crossbars, said links being adapted to swing said sub-brackets inwardly in different time relations as said cross-bars are swung rearwardly, substantially as described.

5. In a collapsible go-cart a main frame and a handle member pivotally connected thereto movable from an extended position to a parallel relation therewith to collapse the cart, four wheeled sub-brackets pivotally mounted upon the main frame, two beneath each side thereof and swingable inwardly beneath the cart from vertical positions to horizontal positions, parallel levers pivotally mounted on said main frame, operative connection between said levers and said handle member, and links connecting said levers with said brackets, whereby said handle member is adapted to swing said sub-brackets to their folded positions beneath the cart as it is moved from its extended position to parallel relation with the main frame.

6. In a collapsible go-cart having a main frame and a handle member pivotally mounted thereon and movable into a substantially parallel relation thereto, a U-shaped cross bar pivotally mounted on the main frame, connection between the cross bar and the handle member causing simultaneous movement thereof with the handle member, wheeled frames pivotally mounted to swing beneath the main frame, operating links connecting the lower ends of said wheeled-frames with the middle portion of said cross-bar, and a projection or stop carried by the cross bar, located in the path of one of said links and operating to hold said wheeled frames out of locked position when they are folded beneath the main frame.

7. In a collapsible go-cart the combination with a main frame, of wheeled frames pivotally mounted beneath the main frame and adapted to be swung from a substantially vertical position below the side bars of the main frame to a horizontal position beneath the main frame as the cart is collapsed, a swingable cross bar carried by the main frame, operating links positively connecting the lower ends of said wheeled frames with said cross bar, and a projection carried by said cross bar in the path of one of said links adapted to hold said wheeled frames out of locked relation to said cross bar when the cart is collapsed.

8. In a collapsible go-cart, a wheeled frame pivotally mounted below the main frame and adapted to be swung inwardly into substantially parallel relation thereto when the cart is collapsed, said wheeled frame comprising three bars rigidly united at their lower ends and spreading apart longitudinally of the main frame, at their upper ends, and pivotally mounted thereon, a wheel trunnion carried by said bars at their lower ends and a wheel rotatably mounted thereon.

9. In a collapsible go-cart, a wheeled frame pivotally mounted below the main frame and adapted to be swung inwardly into substantially parallel relation thereto when the cart is collapsed, said wheel frame comprising three legs radiating upward from a common point spreading longitudinally of the main frame and pivotally connected thereto at their upper ends, two of said legs being formed from a continuous bar and having their connecting portion formed into a trunnion receiving eye.

10. In a collapsible go-cart, the combination with a main frame and a handle member pivotally connected and movable to parallel relation to collapse the cart, of a running gear which includes two separate and independent wheeled sub-brackets pivotally mounted beneath one side of the main frame, one in front of the other, and swingable inwardly from a vertical running position to a horizontal closed position beneath the main frame, and mechanism connecting the sub-brackets with the handle member and main frame, adapted to swing said brackets from their open to their closed positions, one in advance of the other, as the handle member is closed upon the main frame, substantially as described.

11. In a collapsible go-cart, a main frame in combination with four sub-brackets pivotally mounted thereon and foldable therebeneath, a handle member pivotally mounted upon the main frame and movable from an extended position to a closed position in substantial parallel relation thereto, means for locking said handle member in its extended position and means connecting said sub-brackets to said handle member for folding said sub-brackets beneath the main frame as the handle member is swung forward and vice versa and said mechanism serving to maintain said sub-brackets in vertical position when said handle member is locked in its extended position, substantially as described.

12. In a collapsible go-cart a main frame and a handle member pivotally connected thereto and movable from an extended position to a substantially parallel relation to the main frame to collapse the cart, two front and two rear foldable wheeled sub-brackets pivotally mounted on the main frame and foldable therebeneath, two swinging levers carried by the main frame and operable by the handle and diagonal links connecting the middle portions of respective levers to respective pairs of sub-frames for swinging said sub-frames inwardly into substantially parallel relation to the main frame as the handle member is moved into parallel relation to the main frame.

13. In a collapsible go-cart, a main frame, in combination with four subbrackets movably mounted thereon and foldable therebeneath, a handle member pivotally mounted upon the main frame and movable from an extended position to a closed position, in substantially parallel relation thereto to collapse the cart, means connecting said sub-brackets to said handle member for folding said subbrackets beneath the main frame as the handle member is swung forward and vice versa and means for locking said handle member and subbrackets in extended or opened positions.

14. In a collapsible go-cart, the combination with a main frame and a handle member pivotally connected and movable to parallel relation to collapse the cart of a running gear which includes two separate and independent wheeled subbrackets pivotally mounted beneath one side of the main frame, one in front of the other and swingable inwardly from a vertical running position to a folded position beneath the main frame and linked mechanism connecting the subbrackets with the handle member and main frame, adapted to swing said brackets from their open to their closed positions one in advance of the other as the handle member is closed upon the main frame.

15. In a collapsible go-cart, a wheeled frame pivotally mounted below the main frame and adapted to be swung inwardly in substantially parallel relation thereto when the cart is collapsed, said wheel frame comprising a plurality of bars radiating upwardly from a common point spreading longitudinally of the frame and pivotally connected thereto at their upper ends, a wheeled trunnion carried by said bars at their lower ends and a wheel rotatably mounted thereon.

16. In a collapsible go-cart, a wheeled frame pivotally mounted below the main frame and adapted to be swung inwardly into substantially parallel relation thereto when the cart is collapsed, said wheel frame comprising a plurality of bars radiating upward from a common point spreading longitudinally of the main frame and pivotally connected at their upper ends, two of said legs being formed from a continuous bar and having their connecting portions formed into a trunnion receiving eye.

17. A collapsible go-cart having a main frame end a handle member pivoted thereon and movable into substantially parallel relation therewith to collapse the cart, in combination with wheeled frames pivotally mounted beneath the main frame and adapted to be swung from a substantially vertical position below the side bars of the main frame to a horizontal position beneath the main frame as the cart is collapsed, a swinging cross bar carried by the main frame, links connecting the bar with the handle member for movement therewith, and operating links positively connecting the lower ends of said wheeled frames with said cross bar whereby when the handle member is closed upon the main frame the wheeled frames are folded beneath the cart and vice versa.

18. In a collapsible go-cart the combination with a main frame and a handle member pivotally mounted upon one end thereof and foldable thereupon into substantially parallel relation thereto to collapse the cart, of two pairs of wheeled sub-frames pivotally mounted beneath the main frame, one in front of the other and foldable therebeneath, a swinging cross bar pivotally mounted on the main frame and linked to the handle member for movement therewith, diagonal links connecting the middle portion of the cross bar with the forward pair of wheeled sub-frames, a second swinging cross bar linked to the first cross bar for movement therewith, and a second pair of diagonal links connecting the middle portion of the second cross bar with the rear pair of wheels whereby the wheels are folded beneath the frame in sequential time relation.

19. In a collapsible go-cart a main frame and a handle member pivoted thereon and movable into substantially parallel relation therewith to collapse the cart, in combination with a forward and a rear pair of wheeled sub-frames pivotally mounted on the main frame and foldable therebeneath, operating mechanism carried by the cart and connected with the handle for operation thereby, a forward pair of links connecting the forward pair of wheels with the operating mechanism, and a rear pair of links connecting the rear pair of wheels with the operating mechanism for folding said wheels beneath the frame of the cart when the handle is folded down upon the cart, the forward pair of links being longer than the rear pair of links, whereby the rear wheels are folded together in advance of the forward wheels.

20. In a collapsible go-cart a main frame and a handle member pivotally connected thereto and movable from an extended position to a parallel relation therewith to collapse the cart, in combination with a forward and a rear pair of wheeled sub-frames pivotally mounted beneath the cart and adapted to be folded beneath the main frame when the cart is collapsed, a link mechanism carried by the cart and connected with the handle member for movement therewith, a diagonal link connecting each sub-frame with the link mechanism for folding the sub-frame beneath the cart when the handle member is closed upon the cart, the links connected to one pair of sub-frames being longer than the links connected to the other pair of sub-frames, whereby one pair of wheels is folded beneath the cart in advance of the other pair.

In testimony whereof, I have hereunto set my hand, this 10th day of November, 1910, in the presence of two subscribing witnesses.

MARSHALL B. LLOYD.

Witnesses:
LAURA S. LARSEN,
C. M. DALRYMPLE.

Copies of this patent may be obtained for five cents each, by addressing the "Commissioner of Patents, Washington, D. C."